March 16, 1965   C. C. DE PEW   3,173,570
FILLER CAP ASSEMBLIES
Filed July 24, 1963   3 Sheets-Sheet 1

INVENTOR.
CHESTER C. DE PEW
BY John P. Chandler
HIS ATTORNEY.

March 16, 1965  C. C. DE PEW  3,173,570
FILLER CAP ASSEMBLIES
Filed July 24, 1963  3 Sheets-Sheet 2

INVENTOR.
CHESTER C. DE PEW
BY John P. Chandler
HIS ATTORNEY.

March 16, 1965  C. C. DE PEW  3,173,570
FILLER CAP ASSEMBLIES

Filed July 24, 1963  3 Sheets-Sheet 3

INVENTOR.
CHESTER C. DE PEW
BY John P. Chandler
HIS ATTORNEY.

United States Patent Office 3,173,570
Patented Mar. 16, 1965

3,173,570
FILLER CAP ASSEMBLIES
Chester C. De Pew, 254 Prospect St.,
Farmingdale, N.Y.
Filed July 24, 1963, Ser. No. 297,741
6 Claims. (Cl. 220—40)

This invention relates to filler cap assemblies and relates more particularly to a novel closure cap for fuel tanks such as are used in aircraft and which are normally maintained under positive pressure.

An important object of the invention is to provide a structurally and functionally improved closure cap of lightweight construction and formed principally from sheet metal and wherein manipulation of a handle breaks the seal and effectively vents any pressures in the tank which are in excess of atmospheric pressure.

A further object of the invention is to provide a novel means for mounting an O ring in a filler cap assembly wherein a circular base plate inexpensively stamped out from sheet metal has a marginal recess to receive the O ring which is retained therein by a flat retainer plate, said plates carrying a fixed pin which forms a stop limiting rotation of a clamping plate formed with radial fingers which underlie a flange in an adapter. This clamping plate with its radial fingers is mounted on a central shaft which moves the clamping plate over a portion of a revolution from lock to unlocked position. The shaft is manually rotated by a handle pivoted at the upper end of the shaft and a locking wire or keeper pin passes through an opening at the upper end of the fixed pin to retain the handle in locked position.

Figure 1:
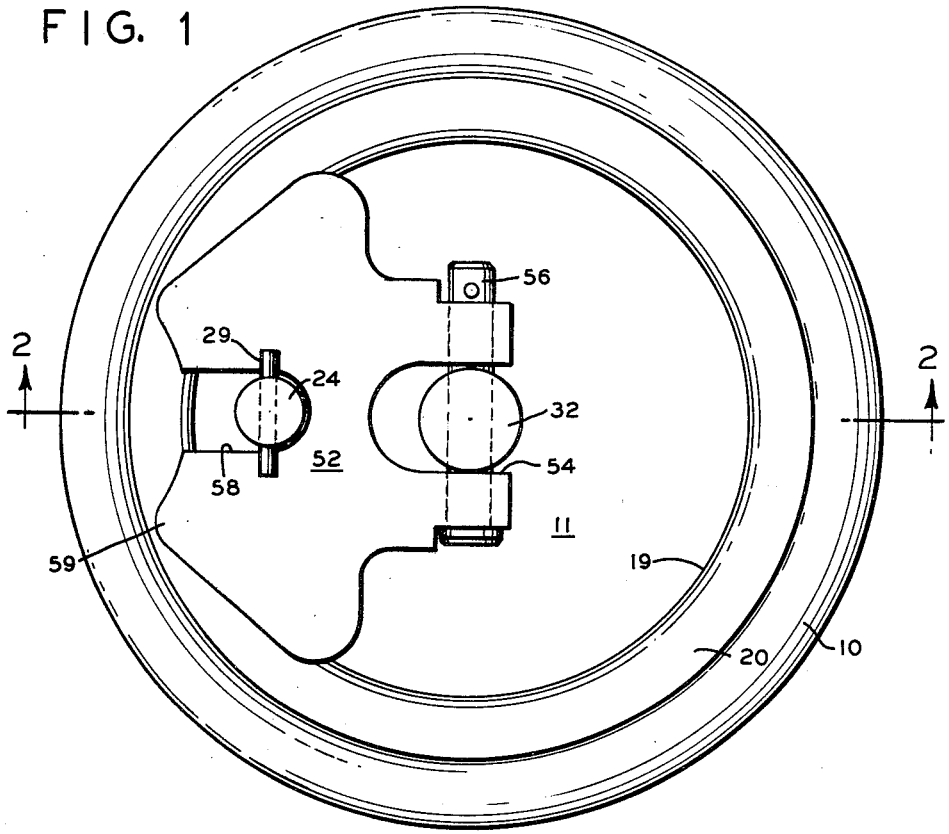
FIG. 1 is a plan view of filler cap assembly embodying the present invention.

The closure cap of the present invention is received in an adapter 10 which is usually stamped out from sheet metal and which is secured within a suitable opening in a tank (not shown). The cap includes a base plate 11 stamped from sheet metal and having a central apertured section 12 which receives a hub 14. The base plate also includes a downwardly inclined or cone shaped intermediate section 16 which terminates in an upwardly curved section 18 which merges into a vertical section 19 and a horizontal annular rim 20, thus forming an inverted L-shaped annular recess which receives an O ring 21 which effects the sealing action. Because of the conical shape of the base plate and its resultant "Belleville" washer effect which materially stiffens the plate, thinner metal can be used with a resultant reduction in weight.

On one side of the conical intermediate section there is a downwardly recessed portion with a flat base 22 having an opening which receives a post 24 having an enlarged lower section 26 forming a shoulder 28 which abuts against the base plate and is secured within the opening by brazing or welding. This post has an opening at its upper end to receive a keeper pin or lock wire 29 securing the handle in locked position.

Figure 2:
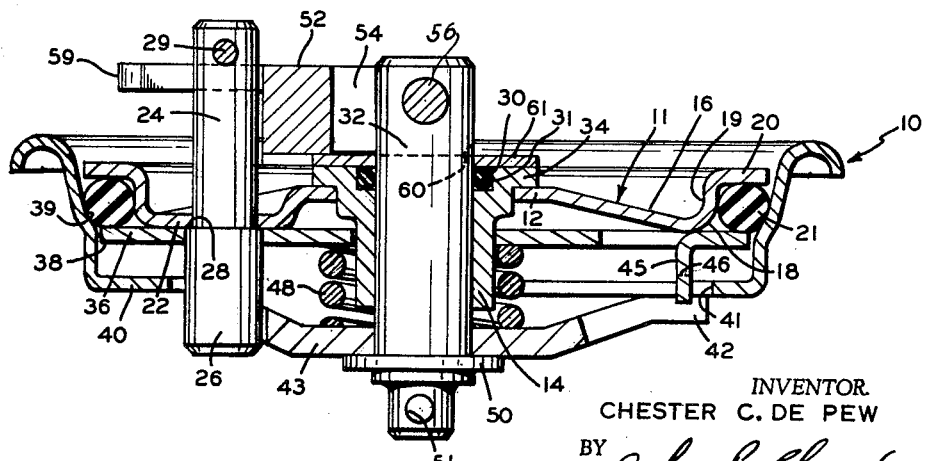
FIG. 2 is a section taken on line 2—2 of FIG. 1.
Figure 3:
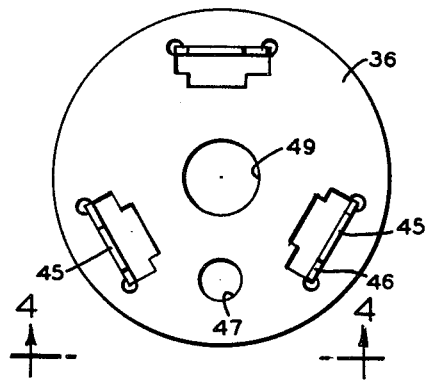
FIG. 3 is a bottom plan view of the O ring retainer plate.
Figure 4:
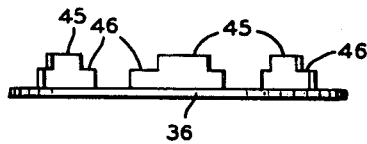
FIG. 4 is a side elevational view thereof.
Figure 5:
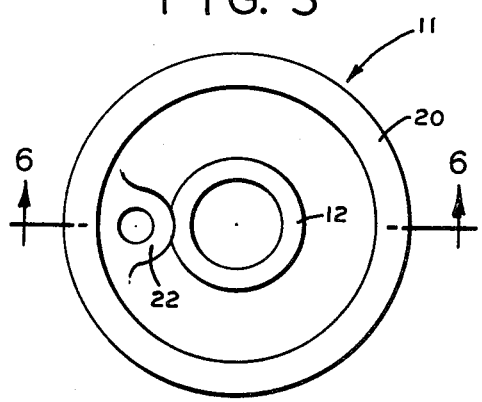
FIG. 5 is a bottom plan view of the retainer plate for the O ring.
Figure 6:
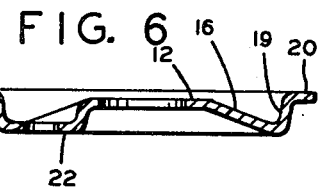
FIG. 6 is a section taken on line 6—6 of FIG. 5.

The hub 14 has an internal recess 30 which receives an O ring 31 which effects a sealing action between the hub and a central shaft 32. The hub further has an enlarged upper section 34 which receives the central apertured section 12 of the conical base plate, and is brazed thereto. The larger O ring 21 is retained in its annular seat formed by elements 19–20, by means of a flat retainer plate 36 having a diameter less than the diameter of base plate 11 and only slightly less than the inner diameter of the section 38 of the adapter 10 at the level occupied by the retainer plate when the parts are in the locked position of FIG. 2. Above the point 38 the adapter plate has an outwardly curved section 39 which is engaged by the O ring 21 to effect the seal between the cap and the adapter. This adapter further has a base section 40 with a number of slots 41 through which fingers 42 of a clamping plate pass. This plate has a central section 43 which is secured as by brazing to the lower end of shaft 32 and the fingers extend upwardly of this central section. This plate also has a shouldered section 44 (FIG. 7) between two adjacent fingers. The lower extension 26 of fixed post 24 acts as a stop, and rotation of the clamping plate is permitted in the arcuate span between shoulder 44 and an adjacent finger 42'. Retainer plate 36 has downwardly punched out ears 45 cut away at each side at 46, a central opening 49 for hub 14 and a side opening 47 for post extension 26. The ears 45 are received in slots 41 in the adapter and are used for positioning the cap therein and for preventing rotation of the cap assembly as the handle is turned to locked position. On each side of ear 45 the metal is cut away at 46 to form shoulders which engage the upper surface of section 40 of the adapter and prevent any rocking motion of the cap assembly before the shaft is rotated to locked position. A spring 48 is positioned between retainer plate 36 and clamping plate 43. The clamping plate is secured at the lower end of the shaft by means of a split ring 50 which is received in a slot (not shown). The lower end of the shaft has a reduced section with a hole 51 to receive a chain (not shown) to keep the cap assembly captive in the adapter. A handle 52 has a central cut out 54 to receive shaft 32 to which it is secured by a pivot pin 56. The handle, which may be a forging or a casting, is further formed with a cut out 58 on its rear section to clear the top of stop post 24. The forward section of the handle has a greater thickness than does the rear section, as shown at 59 in FIG. 2. This forward section has a rounded portion 60 on its lower surface and when the handle is rotated from its upright or open position to its horizontal or closed position of FIG. 2, this curved section operates against a wear plate 61 and cams the fingers 42 upwardly against the lower face of flange 40 of the adapter.

To effect closure of the tank, the cap assembly with handle 52 in vertical position is placed in the adapter with ears 45 passing into the slots 41 in the base of the adapter. The shoulders 46 do not pass into the slot but rather do they rest on the upper face of adapter flange 40 and act as leveling stops since rarely does the cap have a perfectly horizontal position as it is moved into closed position. When the high point 60 of the cam on handle 52 is in its lowermost position all three shoulders 46 generally contact the adapter flange but on continued rotation of the handle to the position of FIG. 2, the camming action is relaxed sufficiently to allow the shoulders to raise to the dotted line position of FIG. 2. The shoulders thus have a sort of squeezing action on this upper face of the flange during movement of the handle from open to closed position. The width of ears 45 is something less than the width of slots 41 so as to permit easy insertion of the ears. In this position, fingers 42 of the clamping plate 43 underlie ears 45 as clearly shown in FIG. 7.

Figure 7:
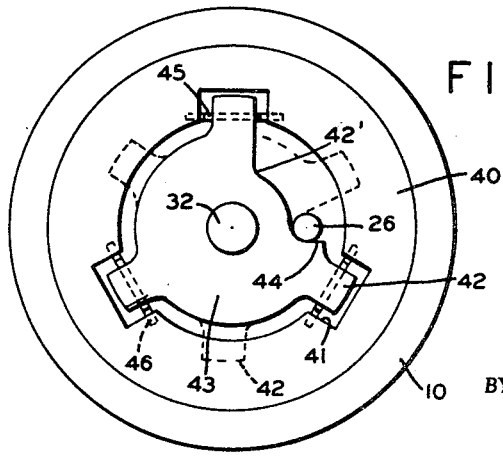
FIG. 7 is a bottom plan view of the clamping cone plate.

The handle 52 is now grasped and rotated from the full line position to the dotted line position of FIG. 7 at which time the fingers underlie the base 40 of the adapter. The handle is now rotated downwardly to the position of FIG. 2 and the cap is locked. Pin 29 prevents unlocking action.

Figure 8:
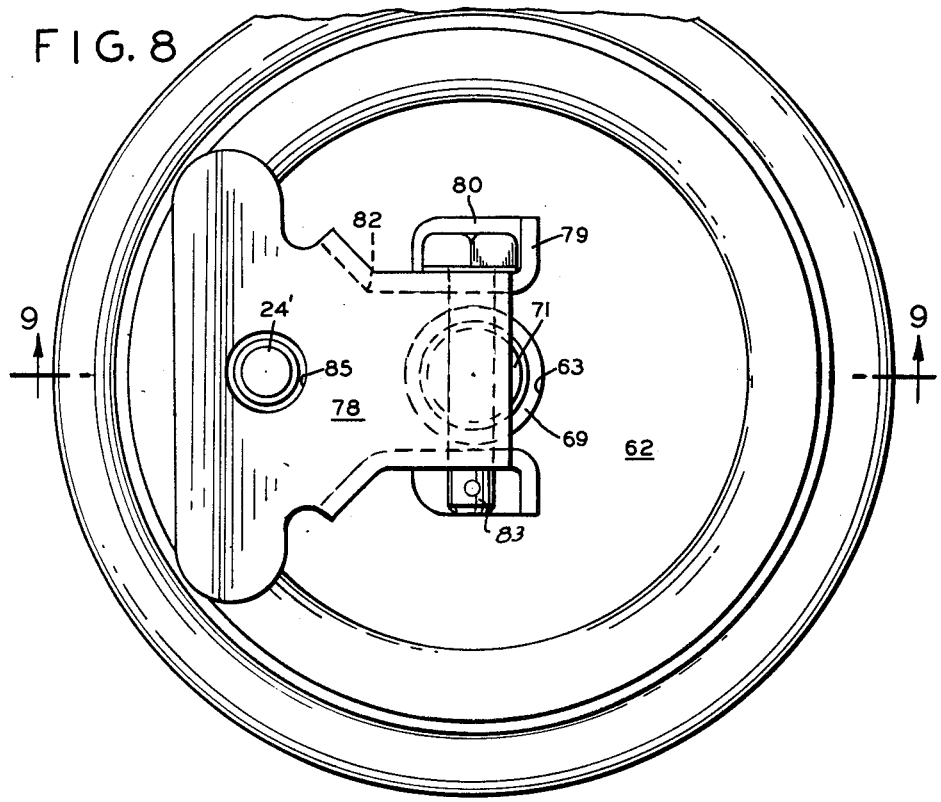
FIG. 8 is a plan view showing a slightly modified handle and base plate construction.
Figure 9:
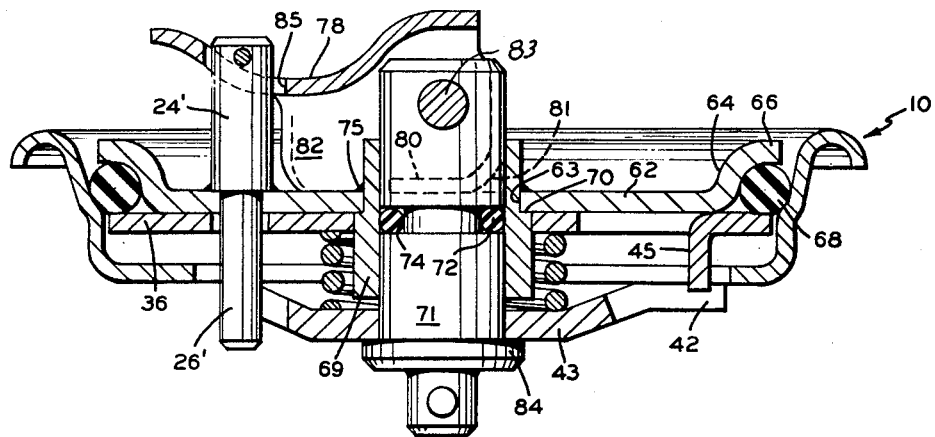
FIG. 9 is a section taken on line 9—9 of FIG. 8.

A slightly modified base plate and handle arrangement is shown in FIGS. 8 and 9 wherein the base plate 62, with its central opening 63, is flat over its entire area except for the upwardly curved flange 64 and flat rim 66 forming the seat for the O ring 68. The hub 69 has a shoulder 70 which engages and is brazed at 75 to the upper face of the base plate 62 and extends upwardly above the base plate for a considerable distance to provide greater bearing surface for shaft 71. Instead of forming a recess in the hub for a sealing O ring 72, the recess 74 is formed in the shaft.

The adapter 10, the retainer plate 36 and the clamping plate 43 are the same as in the first embodiment. The handle 78 is formed from sheet metal and has ears 79 on each side which have base sections 80 formed with curved portions 81 and downwardly projecting side portions 82. It is pivoted on the post by a pin 83. In this embodiment, the stop post 24' has a reduced lower section 26' to effect a saving of weight. The shaft has a shoulder 84 at its lower end for retaining the clamping plate in position.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A closure cap for fuel tanks and the like having an adapter with a lower flange having slots therein, said cap including a base plate stamped out from sheet metal and having a raised inverted L-shaped annular rim and an O ring seated therein, a flat plate carried below the base plate and retaining the O ring within its seat, a clamping plate mounted for limited rotation below the flat plate and provided with a plurality of radially extending fingers, said fingers passing through the slots in the adapter flange when the cap is initially placed in the adapter, said plates having aligned central openings therein, a hub mounted in the central openings in the two upper plates, a shaft journalled in said hub and supporting the clamping plate, a handle pivoted at the upper end of the shaft and formed with a camming surface to raise the handle upwardly after the clamping plate has been rotated sufficiently to cause the fingers to underlie the adapter flange, and a post carried by the base plate and which projects between two clamping plate fingers to limit rotation thereof.

2. The structure recited in claim 1 wherein the flat plate has downwardly extending ears which are disposed in the adapter flange slots.

3. The structure recited in claim 2 wherein said ears have portions which rest on the upper face of said flange with a squeezing action to retain the cap in a parallel position on adapter.

4. The structure recited in claim 1 wherein the upper end of the post has means securing the handle in closed position.

5. A closure cap for fuel tanks and the like having an adapter with a lower flange with slots therein, said cap including a base plate stamped out from sheet metal and having a raised, inverted L-shaped annular rim and an O ring seated therein, a flat plate carried below the base plate and retaining the O ring within its seat, a clamping plate mounted for limited rotation below the flat plate and provided with a plurality of radially extending fingers and a stop carried by one of the fingers, said fingers passing through the slots in the adapter flange when the cap is initially placed in the adapter, said plates having aligned central openings therein, a hub mounted in the openings in the two upper plates, a shaft journalled in said hub and supporting the clamping plate, a handle pivoted at the upper end of the shaft and formed with a camming surface to raise the handle upwardly after rotation of the clamping plate to cause the fingers to underlie the adapter flange, and a fixed post carried by the base plate and limiting rotation of the clamping plate between said stop and an adjacent finger, and a pin at the upper end of the post.

6. The structure recited in claim 5 wherein the post has an aperture at its upper end and receives a pin for securing the handle in closed position and against rotation.

References Cited by the Examiner

UNITED STATES PATENTS 3,006,499  10/61  Corbett _____ 220—25
3,086,675  4/63   Clark _____ 220—24.5

THERON E. CONDON, *Primary Examiner.*